United States Patent
Gutman et al.

[15] 3,692,900
[45] Sept. 19, 1972

[54] BIS-PHOSPHOROAMIDES, BIS-PHOSPHONOAMIDES, AND PHOSPHONO-PHOSPHOROAMIDES USEFUL AS INSECTICIDES AND MITICIDES

[72] Inventors: Arnold D. Gutman, Pinole; Ashley H. Freiberg, Santa Clara, both of Calif.

[73] Assignee: Stauffer Chemical Company, New York, N.Y.

[22] Filed: Dec. 22, 1969

[21] Appl. No.: 889,821

Related U.S. Application Data

[60] Division of Ser. No. 654,692, July 20, 1967, Pat. No. 3,577,088, which is a continuation-in-part of Ser. No. 390,280, Aug. 17, 1964, abandoned.

[52] U.S. Cl. ................................................424/205
[51] Int. Cl. .................................................A01n 9/36
[58] Field of Search .....................424/205; 260/928

[56] References Cited

UNITED STATES PATENTS

| | | | |
|---|---|---|---|
| 3,234,305 | 2/1966 | Malz et al. | 424/205 |
| 3,236,919 | 2/1966 | Szabo et al. | 424/205 |
| 3,517,088 | 6/1970 | Gutman et al. | 260/928 |

*Primary Examiner*—Albert T. Meyers
*Assistant Examiner*—Vincent D. Turner
*Attorney*—Wayne C. Jaeschke and Edwin H. Baker

[57] ABSTRACT

Bis-phosphoroamides, Bis-phosphonoamides and phosphono-phosphoroamides of the general formula

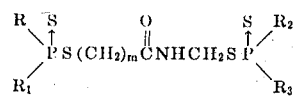

in which $m$ is the integer 1 or 2, R and $R_2$ are independently selected from the group consisting of lower alkyl and lower alkoxy, $R_1$ and $R_3$ are independently selected lower alkoxy groups. The sum of the carbon atoms in R, $R_1$, $R_2$, and $R_3$ being a maximum of 12. Included in this invention is a method of preparing, using and applying said compositions. The compounds are particularly valuable for their insecticidal and miticidal properties. Representative compounds are 3-(0,0-diethyl-phosphorodithioyl)-N-(0,0-diethylphosphorodithioyl-methyl)propionamide, 3-(0,0-diethylphosphoro-dithioyl)-N-(0,0-dimethylphosphorodithioylmethyl)propionamide, and 2-(0-ethyl-ethylphosphonodithioyl)-N-(0,0-diethylphosphorodithioylmethyl)acetamide.

6 Claims, No Drawings

BIS-PHOSPHOROAMIDES, BIS-PHOSPHONOAMIDES, AND PHOSPHONO-PHOSPHOROAMIDES USEFUL AS INSECTICIDES AND MITICIDES

This application is a division of copending application, Ser. No. 654,692, filed July 20, 1967, now U.S. Pat. No. 3,577,088, which in turn is a continuation-in part of application, Ser. No. 390,280, filed Aug. 17, 1964, and now abandoned

BACKGROUND OF THE INVENTION

This invention relates to a new and novel class of phosphorous containing amides and the use of same as insecticides and acaricides. The compounds are particularly valuable for their insecticidal and miticidal properties. More specifically, this invention relates to bis-phosphoroamides and bis-phosphonoamides and phosphono-phosphoroamides of the general formula

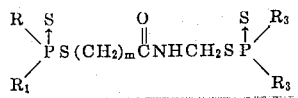

in which $m$ is the integer 1 or 2, $R$ and $R_2$ are independently selected from the group consisting of lower alkyl and lower alkoxy, $R_1$ and $R_3$ are independently selected lower alkoxy groups. The sum of the carbon atoms in $R$, $R_1$, $R_2$ and $R_3$ being a maximum of 12. Included in this invention is a method of preparing, using and applying said compositions.

The new compounds of this invention, bis-phosphoroamides, bis-phosphonoamides and phosphono-phosphoroamides, are made according to the following general reactions.

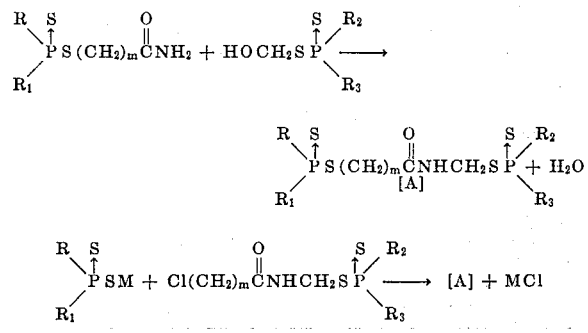

wherein M is an alkali metal, such as sodium and potassium, and R, $R_1$, $R_2$, and $R_3$ are defined as above.

The method of preparing the compounds of the present invention as well as the manner of using them in insecticidal and acaricidal compositions is illustrated further in the following non-limiting examples.

EXAMPLE 1

Preparation of 3-(0,0-diethylphosphorodithioyl)-N-(0,0-diethylphosphorodithioylmethyl) propionamide.

To 17.8 g. (0.25 moles) of acrylamide was added slowly 46.5 g. (0.25 moles) of 0,0-diethyldithiophosphoric acid at such a rate that the temperature was maintained below 45°C. After the addition was complete, the mixture was warmed on a steam bath at 60°C. for one hour. To the reaction mixture was added 150 ml. of chloroform, and the solution was washed twice with 100 ml. portions of water. The chloroform phase was dried with anhydrous magnesium sulfate and was evaporated on a steam bath. This yielded 64.3 g. (99.8 percent of theory) of 3-(0,0-diethylphosphoro) propionamide, an intermediate in the total synthesis.

In a 500 ml. 3-necked flask equipped with a stirrer, a Dean Stark tube, and a condenser, were combined 12.9 g. (0.05 moles) of the above0prepared 3-(0,0-diethylphosphorodithioyl) propionamide, 10.8 g. (0.05 moles) of hydroxymethyl-0,0-diethylphosphorodithioate, 200 ml. of benzene, and 0.1 g. of β-naphthalene sulfonic acid. The mixture was refluxed until the theoretical amount of water was removed by the benzene azeotrope. The reaction mixture was then cooled to room temperature and washed with two 100 ml. portions of water. The benzene phase was dried over anhydrous magnesium sulfate and evaporated on a steam bath. There was obtained a yield of 20.1 g. (88.2 percent of theory) of the title compound, $n_D^{30} = 1.5440$.

EXAMPLE 2

Preparation of 3-(0,0-diethylphosphorodithioyl)-N-(0,0-dimethylphosphorodithioylmethyl) propionamide.

In the same manner as Example 1, 12.9 g. (0.05 moles) of 3-(0,0-diethylphosphorodithioyl) propionamide, 9.4 g. (0.05 moles) of hydroxymethyl-0,0dimethylphosphorodithioate, 200 ml, of benzene, and 0.1 g. of β-naphthalene sulfonic acid were reacted. Upon work-up and purification there was obtained a yield of 19.8 g. (92.8 percent of theory) of the title compound, $n_D^{30} = 1.5488$.

In addition to the above-mentioned compounds, 3-(0,0-di-i- propylphosphorodithioyl)-N-(0,0-dimethylphosphorodithioylmethyl) propionamide was prepared using the corresponding reagents in a similar reaction as Example 1.

EXAMPLE 3

Preparation of 2-(0-ethyl-ethylphosphonodithioyl-N-(0,0-diethylphosphorodithioylmethyl) acetamide.

In 100 ml. of acetone were combined 6.3 g. (0.021 moles) of N-(0,0-diethylphosphorodithioylmethyl)chloroacetamide and 10.4 g. (0.05 moles) of potassium 0-ethyl-ethylphosphonodithioate. The mixture was heated under reflux for 1 hour. 200 ml. of benzene was added, and the mixture was washed with 2–75 ml. portions of water. The benzene phase was dried over anhydrous magnesium sulfate and then evaporated. There was obtained 9.0 g. (98 percent of theory) of the title compound $n_D^{30} = 1.5100$.

The following table is a listing of representative compounds which are prepared according to the above-described procedures. Compound numbers have been assigned to each compound and are then used for identification throughout the balance of the application.

TABLE 1

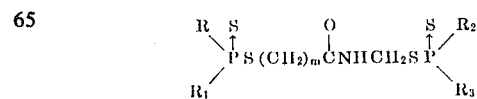

| Compound Number | m | R | R₁ | R₂ | R₃ |
|---|---|---|---|---|---|
| 1 | 2 | C₂H₅O | C₂H₅O | C₂H₅O | C₂H₅O |
| 2 | 2 | C₂H₅O | C₂H₅O | CH₃O | CH₃O |
| 3 | 2 | i-C₃H₇O | i-C₃H₇O | CH₃O | CH₃O |
| 4 | 1 | C₂H₅ | C₂H₅O | C₂H₅O | C₂H₅O |
| 5 | 1 | C₂H₅O | C₂H₅O | CH₃O | CH₃O |
| 6 | 1 | C₂H₅O | C₂H₅O | C₂H₅O | C₂H₅O |
| 7 | 1 | C₂H₅ | i-C₄H₉O | CH₃O | CH₃O |
| 8 | 1 | C₂H₅ | i-C₄H₉O | C₂H₅O | C₂H₅O |
| 9 | 1 | C₂H₅ | C₂H₅O | CH₃O | CH₃O |
| 10 | 2 | C₂H₅ | i-C₄H₉O | C₂H₅ | i-C₄H₉O |
| 11 | 1 | C₂H₅ | C₂H₅O | C₂H₅ | C₂H₅O |
| 12 | 2 | i-C₃H₇O | i-C₃H₇O | C₂H₅ | i-C₄H₉O |

As previously mentioned, the herein described compositions produced in the above-described manner are biologically active compounds which are useful and valuable in controlling various pest organisms, The compounds of the invention are evaluated in the following tests.

Miticide evaluation tests. The two-spotted mite, Tetranychus telarius (Linn.), was employed in tests for miticidal activity. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175 percent v/v Sponto 221 (polyoxy-ethylene ether of alkylated phenols blended with organic sulfonates), an emulsifying agent. The test suspensions were then sprayed on the infested pinto beam plants. After seven days, mortalities of post-embryonic forms were determined.

At the same time, pinto bean plants in the primary leaf stage were placed in tubes containing 100 ml. of test solution and held in place with cotton plugs. Only the roots were immersed. The solutions were prepared in the usual way, the final acetone concentration never exceeding 1.0 percent. This test evaluated the root absorption and upward translocation of the candidate systemic compound. After the plants were thus arranged, they were infested with two-spotted mites. The LD–50 and LC–50 values for the above tests were determined using well-known procedures.

Compound Number 1 has a contact LC–50 value of 0.05 percent for the post-embryonic form of the mite tested. The diethoxy-dimethyl substituted compound, compound Number 2, has a contact LC–50 value of 0.01 percent and a systemic LD–50 value of 0.75 ppm. The di-i-propoxy-dimethyl substituted compound, compound Number 3, has a contact LC–50 value of 0.01 percent and a systemic LD–50 value of 2.0 ppm. Compound Number 5 has a contact LC–50 of 0.005 percent on the post-embryonic form and 0.03 percent on the eggs, and a systemic LD–50 of 8.0 ppm.

The compounds of the present invention were found to control housefly - Musca domestica (Linn.). 25 female flies, 3 to 5 days old, were caged in cardboard tubes and continuously exposed to known residue of the active compound in the cage. After 24 and 48 hours counts were made to determine living and dead insects. The LD–50 values were then calculated. The following values were obtained: Compound Number 1 - 75µg/250, 3 - 100µg/250, 5 - 75µg/250 and 6 - 0.1%/250.

From these data it can be seen that these new compounds are valuable insecticides and acaricides. They may also be used in the form of emulsions, non-aqueous solutions, wettable powders, vapors, and dusts and the like, as may be vest fitted to the particular utility. The application to a pest habitat of the compounds of the present invention are well known to those skilled in the art.

Various changes and modifications may be made without departing from the spirit and scope of the invention described herein as will be apparent to those skilled in the art to which it pertains. It is accordingly intended that the present invention shall only be limited by the scope of the appended claims.

What is claimed is:

1. A method of controlling insects and acarids which comprises contacting said insects and acarids with an insecticidally and acaricidally effective quantity of a compound having the formula

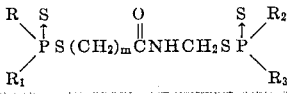

in which $m$ is the integer 1 or 2, R and $R_2$ are independently selected from the group consisting of lower alkyl and lower alkoxy, $R_1$ and $R_3$ are independently selected lower alkyl groups, the sum of R, $R_1$, $R_2$ and $R_3$ being a maximum of 12.

2. The method of claim 1 in which R, $R_1$ and $R_2$ and $R_3$ are each ethoxy, and $m$ is 2.

3. The method of claim 1 in which R and $R_1$ are each ethoxy, $R_2$ and $R_3$ are each methoxy, and $m$ is 2.

4. The method of claim 1 in which R and $R_1$ are each iso-propoxy, $R_2$ and $R_3$ are each methoxy, and $m$ is 2.

5. The method of claim 1 in which R is ethyl, $R_1$, $R_2$ and $R_3$ are each ethoxy, and $m$ is 1.

6. The method of claim 1 in which R is ethyl, $R_1$ is isobutoxy, $R_2$ and $R_3$ are each ethoxy, and $m$ is 1.

* * * * *